(12) United States Patent
Sahala

(10) Patent No.: US 6,751,308 B1
(45) Date of Patent: Jun. 15, 2004

(54) SIGNALING METHOD AND NETWORK ELEMENT FOR A VIRTUAL PRIVATE NETWORK

(75) Inventor: Kai Sahala, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/148,741

(22) PCT Filed: Dec. 1, 1999

(86) PCT No.: PCT/EP99/09387
§ 371 (c)(1),
(2), (4) Date: Jul. 16, 2002

(87) PCT Pub. No.: WO01/41460
PCT Pub. Date: Jun. 7, 2001

(51) Int. Cl.[7] .................................... H04M 7/00
(52) U.S. Cl. ............................. 379/225; 379/229
(58) Field of Search ................... 379/219, 221.08, 379/221.09, 221.14, 225, 229

(56) References Cited

U.S. PATENT DOCUMENTS 6,075,852 A * 6/2000 Ashworth et al. .......... 379/201

FOREIGN PATENT DOCUMENTS

WO  WO 98/21903  5/1998  ............ H04Q/3/62

OTHER PUBLICATIONS

Allard F: "Broadband Virtual Private Network Signalling" BT Technology Journal, GB, BT Laboratories, vol. 16, No. 2, Apr. 1, 1998, pps. 112–119, XP000750523.

"ITU–T Recommendation Q.765.1. Signalling System No. 7—Application transport mechanism Support of VPN applications with PSS1 information flows" ITU–T Telecommunication Standarization Sector of ITU, May 1, 1998, XP002146480.

* cited by examiner

Primary Examiner—Creighton Smith
(74) Attorney, Agent, or Firm—Cohen, Pontani, Lieberman & Pavane

(57) ABSTRACT

The present invention relates to a signaling method and network element for a virtual private network, wherein a destination capability is determined in response to the receipt of a connection request from a subscriber belonging to the virtual private network. Based on the determination result, an initiation of a virtual private network signaling in the call set-up is decided. Thereby, the signaling load can be reduced already in the originating point if the destination is not able to support the signaling required for the virtual private network. The capability determination may be based on a private numbering plan required for a number translation in the telecommunication network.

19 Claims, 3 Drawing Sheets

SIGNALING METHOD AND NETWORK ELEMENT FOR A VIRTUAL PRIVATE NETWORK

CROSS-REFERENCES TO RELATED APPLICATIONS

This is a U.S. national stage application under 35 U.S.C. §371 of international stage application No. PCT/EP99/09387, filed on Dec. 1, 1999, which date is hereby the filing date of this application under 35 U.S.C. §363.

FIELD OF THE INVENTION

The present invention relates to a signaling method and a network element for a telecommunication network providing a virtual private network (VPN).

BACKGROUND OF THE INVENTION

The VPN concept allows private traffic traditionally served by leased private lines to share the existing trunk capacity of the PSTN (Public Switched Telecommunication Network). This allows for a more efficient utilization of network resources and provides a number of benefits to both operators and users. Network costs can be more closely tied to actual usage. With private networks, the cost of inter-site traffic is tied to the maximum capacity required, not overall usage. VPN also allows for increased flexibility in configuring the network.

QSIG (unified international corporate network signaling standard) is an ISDN common channel signaling system designed for use in corporate networks. It was developed in an open forum for all major European PBX manufacturers. The name QSIG refers to signaling across the ISDN "Q" reference point which is the logical signaling point between two PINXs. QSIG defines a set of protocols for the interaction of PINXs, so that common sets of services and features, with similar appearances, are available to users across private networks, including multi-site networks.

The original standards for QSIG were developed by the ECMA (European Computer Manufacturers Association). Later, these standards were used as a basis for the ETSI (European Telecommunications Standards Institute). The main standards covering the Basic Call Protocol are Layer 2 ETS 300 402-1 based on ITU-T Q.920 and Layer 3 ETS 300 172 (for the PSS1 signaling system) based on ISO/IEC 11572, or EN 301 060 (for the DSS1+ signaling system).

In addition thereto, a standard which covers the Core Generic Functional Protocol for supplementary services for private telecommunication networks has been developed by ISO (ISO/IEC 11582) and given the ETSI identification ETS 300 239. This is the core protocol that the individual supplementary services use to avail of the transport services of the underlying layers.

A VPN product provides QSIG interfaces for interconnecting remote PINXs (Private Integrated Services Network Exchanges) across the PSTN, either via a single exchange or via a number of exchanges in the network. Conceptionally, the entire exchange network is seen by the end PINXs as a simple transit network.

The transport of the QSIG signaling over the PSTN (e.g. ISDN network) is accomplished by "enveloping" QSIG messages within ISUP (ISDN User Part) messages. This method enables common ISUP signaling links and associated bearers to be provisioned for VPN and non-VPN traffic for greater efficiency.

To be able to offer a true on-net call and to provide for the transparent transfer of QSIG messages over the PSTN from the VPN entry point to the VPN exit point (when the VPN extends over multiple exchanges), a technique called Application Transport Mechanism (APM) is used. This means that a call is set up over the PSTN to provide for the connection, and all associated QSIG data is transmitted along the call with the APM mechanism. The receiving end extracts the data and sends an identical message to the destination PINX. Thus, PINXs see the network as a dedicated private network with QSIG signaling.

Since there may be parts of the PSTN that do not support the signaling, or the destination subscriber is not capable of supporting the protocol, a method is defined in the ETSI specification EN 301 062-1 to drop the call to support only a basic call. When such a situation is detected, a so-called gateway function is performed and the necessary parts of the private network signaling are transformed to a PSTN signaling. This method is specified in such a way that the QSIG information is always carried with the call set up in the PSTN. If transparency is lost, i.e. the destination does not support QSIG, then the QSIG data is dropped from subsequent messages in a gateway function of the network after this condition is detected. Hence, the initial OSIG signalling leads to an increased load in the signaling network.

SUMMARY OF THE INVENTION

It is therefore an object of the present invention to provide a signaling method and network element for a telecommunication network providing a virtual private network, by means of which the signaling load in the telecommunication network can be decreased.

This object is achieved by a signaling method for a telecommunication network providing a virtual private network, said signaling method comprising the steps of:
  determining a destination capability in response to the receipt of a connection request from a subscriber belonging to the virtual private network; and
  deciding on the initiation of a virtual private network signaling in the call set-up, based on the determination result in said determination step.

Furthermore, the above object is achieved by a network element for initiating a signaling in a telecommunication network providing a virtual private network, the network element comprising:
  determining means for determining a destination capability in response to the receipt of a connection request from a subscriber belonging to the virtual private network; and
  signaling control means for deciding on the initiation of a virtual private network signaling in the call set-up, based on the determination result of said determining means.

Accordingly, a pre-defined signaling load decrease is enabled by checking the destination capability during the initiation of a set-up procedure in the originating point. If the destination is not able to support the signaling, the originating node performs a gateway function without initiating the VPN signaling in the call set-up. Since it is known that certain types of VPN members do not support the VPN signaling in the first place (e.g. mobile terminals, old PBXs (Private Branch Exchanges)), the load produced by the set-up signaling for these members can be reduced. Known standardized methods may still be used as a back-up for those nodes that can change to support the VPN signaling in the future (e.g. international VPN members).

Preferably, the destination capability may be determined on the basis of a private numbering plan which may be stored at the originating node. Alternatively, the private numbering plan may be stored in an IN (Intelligent Network) node located at the originating node of the connection request. In particular, the virtual private network signaling may not be initiated if the private numbering plan indicates a mobile subscriber as the destination of the call.

Preferably, the network element may be an originating node of the connection request. Particularly, the network element may be a network exchange.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
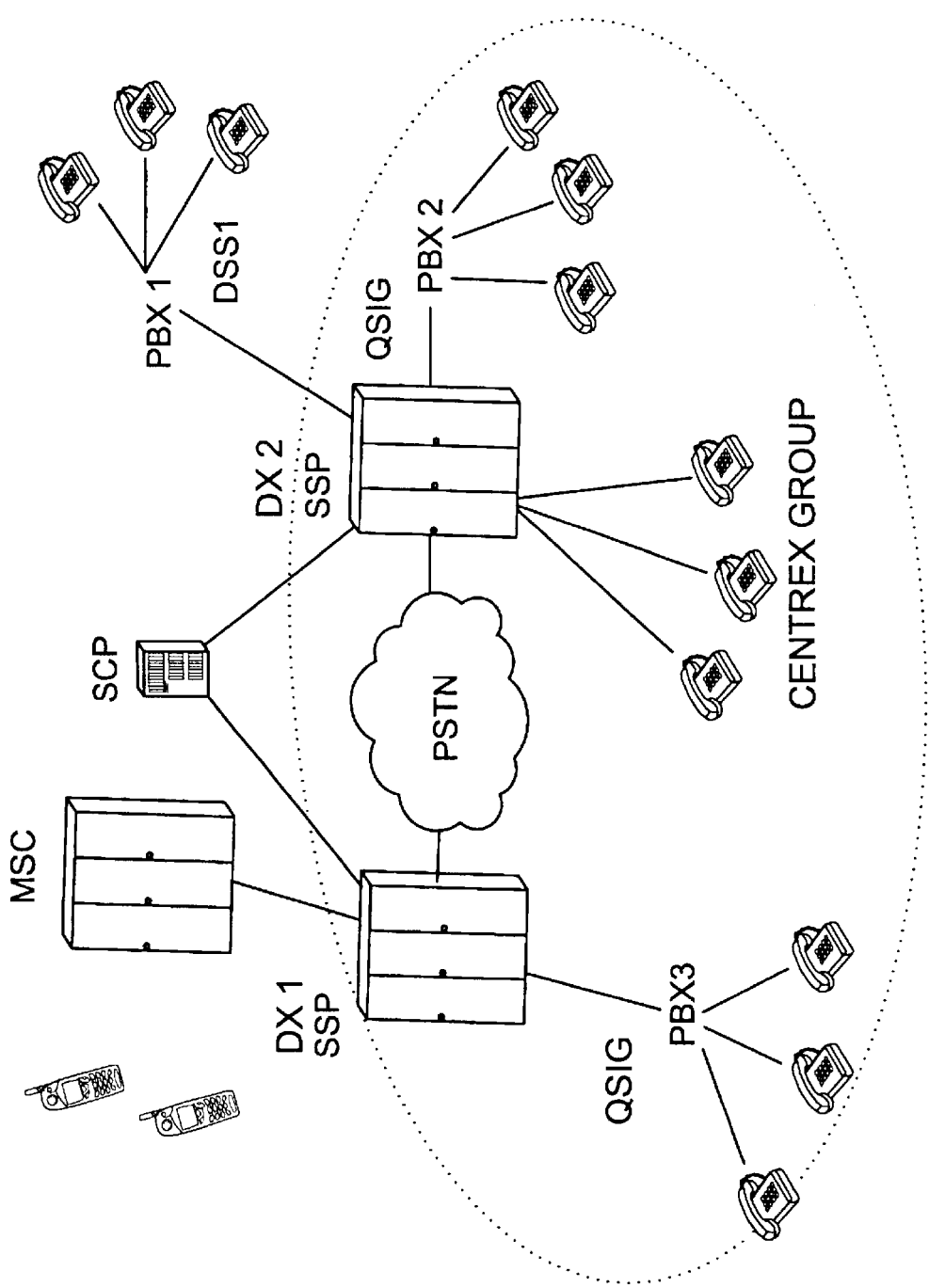
FIG. 1 shows a corporate network for providing a QSIG feature transparency, to which the present invention can be applied.

In the following, the preferred embodiment of the method and network element according to the present invention will be described on the basis of a corporate network structure as shown in FIG. 1.

According to the corporate network shown in FIG. 1, a first network exchange DX1 and a second network exchange DX2 are connected via a PSTN, such as an ISDN network. The network exchanges DX1 and DX2 provide for a directly terminated QSIG interface. The QSIG Access is a 2 Mbit/s interface which implements up to thirty 64 kbit/s B-channels and one 64 kbit/s virtually B-channel structure (30B+D structure). However, other access structures such as a 2B+D structure are possible, as well. The "star" architecture shown in FIG. 1 allows QSIG ports to be provisioned more efficiently. A single QSIG port can be utilized to carry traffic to any or all other points in the VPN. In addition to supporting private traffic, the QSIG interfaces can provide a gateway functionality to carry traffic to and from the PSTN, resulting in increased efficiency in the provision of access ports. The VPN is always customer-specific and the system must be configured to suit the particular customer's requirements. The provision of the VPN network may be based on a software product running on the network exchanges DX1 and DX2. The maximum number of VPN groups depends on the data standard for the switches involved. A VPN indicator in the signaling defines the context to be used. In particular, a PINX connected to one of the network exchanges DX1 and DX2 can be marked to be conforming to specific reference or service entry points.

In case that a call set-up contains a VPN indicator, a VPN call is set up as requiring QSIG feature transparency. Otherwise, a basic call is initiated. A business group ID as defined by ETSI can be set against a VPN group, and the ID is sent with each call to the network to identify that the call is a business group call. The business group ID can be set against the group in a global format.

According to FIG. 1, a first private branch exchange PBX1 and a second private branch exchange PBX2 are connected to the network exchange DX2. In addition thereto, a Centrex group is connected to the second network exchange DX2, wherein the term "Centrex" indicates the provision of telecommunication services similar to a private branch exchange (PBX) from the second network exchange DX2. Thus, a Centrex group can replace a PBX or a key telephone system. Furthermore, a third private branch exchange PBX3 and a Mobile Switching Center (MSC) of a mobile network are connected to the first network exchange DX1.

Additionally, the network exchanges DX1 and DX2 are arranged to provide a Service Switching Point (SSP) function of an IN (Intelligent Network). To achieve this, the network exchanges DX1 and DX2 are connected to a Service Control Point (SCP) of the IN. Thereby, the control of a private numbering plan (PNP) which allows for creation of an individual numbering scheme for each customer VPN can be concentrated to a single point in the network, wherein the IN is used to store the translation table of the VPN. In this case, the network exchanges DX1 and DX2 in the VPN use only the site codes to route the call to an SSP. In the SSP, the translated number triggers the call to be routed to the SCP. The SCP then translates the number to a DDI (Direct Dialing In) number defining a particular extension in a PINX.

Alternatively, in case the IN is not used for the number translation, the PNP may be stored in the network exchanges DX1 and DX2.

As can be gathered from the diagram shown in FIG. 1, the second and third private branch exchanges PBX2 and PBX3 support the QSIG signaling. The same applies to Centrex group. In contrast thereto, the first private branch exchange PBX1 is arranged to use another signaling system, i.e. DSS 1 (Digital Subscriber Signaling System No. 1), and is therefore part of the VPN without the features available for QSIG nodes. The site code feature enables also mobile users to be included in the same numbering plan as the QSIG VPN users. Accordingly, a QSIG feature transparency is achieved for the users inside the dotted line of FIG. 1.

According to the preferred embodiment, the network exchanges DX1 and DX2 are arranged to decide in dependence on the destination capability whether a QSIG signaling is initiated in the set-up of a call, or not, in case a call from a private branch exchange or a Centrex group belonging to the VPN is to be established. Thereby, the signaling load in the VPN group can be reduced for those VPN members not supporting the QSIG signaling. When a user dials a number of a mobile member of the VPN group, no QSIG signaling is carried with the call. In case of a call to another member of the VPN group, which supports the QSIG signaling, the QSIG signaling is initiated. Thereby, the signaling load is reduced already in the originating point, wherein an information about the capability of the VPN group members may be derived e.g. from the PNP or another suitable table or data base provided either in the originating node (e.g. network exchange DX1 or DX2) or in a separate node located close to the originating node (e.g. an IN node).

In case the destination does not support the QSIG signaling, the respective network exchange DX1 or DX2 performs a gateway function and drops unnecessary information relating to the QSIG signaling from the set-up messages. Nevertheless, some VPN features such as the PNP or special charging functions may as well be supported towards the VPN group members not supporting the QSIG signaling. Thus, in the case shown in FIG. 1, the QSIG signaling is not initiated towards the first private branch exchange PBX1 and the Mobile Switching Center MSC.

Figure 2:
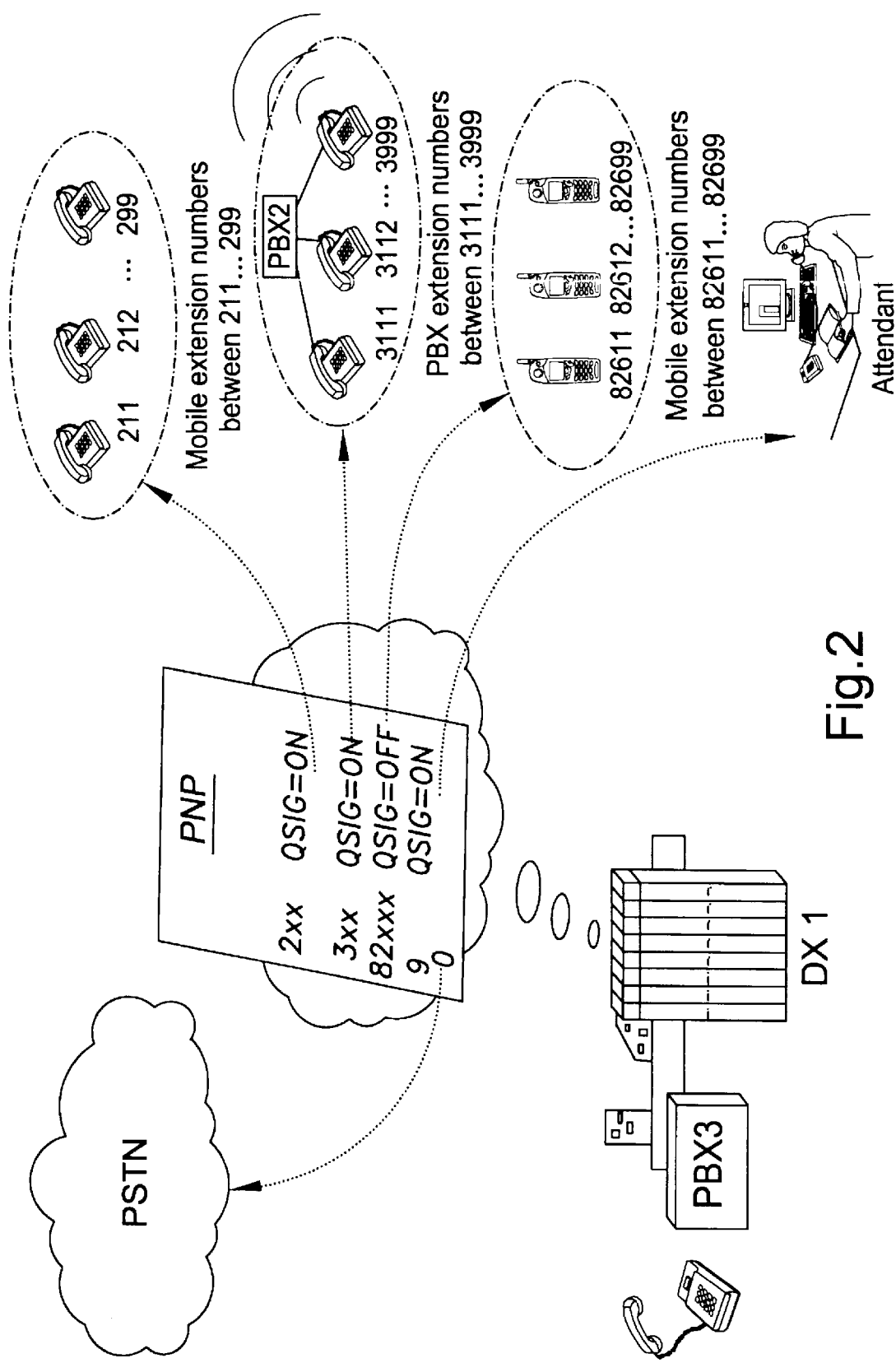
FIG. 2 shows a basic diagram of a VPN group signaling according to the preferred embodiment of the present invention.

FIG. 2 shows a principal diagram of a capability determination performed in the first network exchange DX1 based on the PNP of the established VPN. In this case, the first network exchange DX1 provides for the number translation function between private numbers and public network addresses, to subsequently enable the routing of calls across the PSTN. Each customer VPN or corporate VPN is allowed to have different PNP number translation rules, and the network exchange DX1 determines the translation based on the corporate VPN to which the originated call belongs.

The private number length can be fixed or variable for each VPN, from 3 to 8 digits. This flexibility allows users with existing private networks to be cut-over to the VPN service without modifications to the existing numbering plan. The originating network exchange performs the PNP number translation from the private number to the public form for a call set-up over the public network. Routing within the public network then always uses translated numbers.

According to FIG. 2, the first network exchange DX1 initiates the QSIG signaling on the basis of the first digit(s) of the number indicated in the PNP. In case the number starts with the digit "2", a call is established to one of the Centrex extension numbers defined between 211 and 299. Therefore, the QSIG signaling is initiated. The same applies to the case where the number in the PNP starts with the digit "3", which indicates one of the PBX extension number of the PBX2, ranging between 3111 and 3999. Moreover, in case the number in the PNP starts with the digits "9", or "0", the call is to be established to an attendant connected to the VPN network as a separate node, or to an external PSTN number, respectively, for which the support of the QSIG signaling cannot be decided unambiguously. Therefore, the QSIG signaling is also initiated, such that the conventional standardized method can be used as a back-up feature.

However, if the number starts with "82", the call is to be established to one of the mobile extension numbers ranging between 82611 and 82699. In this case, the QSIG signaling is not initiated, since it is known that mobile terminals do not support the QSIG signaling. The same applies to the specific numbers defined for the first private branch exchange PBX1 according to FIG. 1.

The capability determination may be based on a number comparison operation, or a flag or a bit may be provided which is set in a table (e.g. PNP table) used in the number analysis, so as to indicate the requirement of QSIG signaling initiation.

As already mentioned, the number translation in the network exchanges DX1 and DX2 may as well be based on a translation table (e.g. PNP) stored in an IN node.

Figure 3:
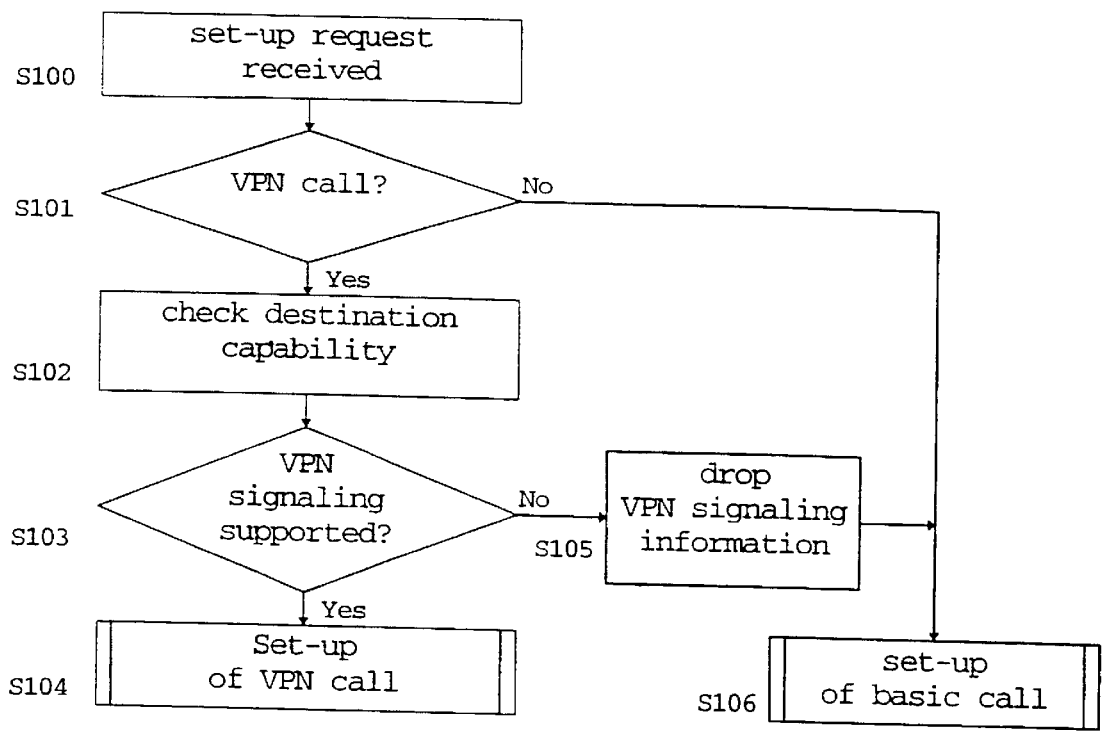
FIG. 3 shows a basic flow diagram of a signaling method according to the preferred embodiment of the present invention.

FIG. 3 shows a basic flow diagram of the signaling method performed in the network exchanges DX1 and DX2.

When a set-up request is received from a connected end terminal in step S100, the network exchange determines based e.g. on the VPN indicator, whether a VPN call is to be established (step S101). If not, the flow proceeds to step S106, where a set-up procedure of a basic call is performed.

If a VPN call is determined in step S101, the destination capability for the VPN signaling (e.g. QSIG signaling) is checked in step S102. This may be based e.g. on the PNP translation table stored in the network exchange or in the IN.

Then, in step S103, it is checked whether the destination supports the VPN signaling (e.g. QSIG signaling), or not (step S103). If not, the VPN signaling information included in the received set-up messages is dropped (step S105) and the procedure proceeds to step S106, where the set-up procedure of the basic call is performed. Thus, the network exchange only performs a gateway function.

If the result of the determination in step S103 indicates that the destination supports the VPN signaling, the flow proceeds to step S104, where the set-up procedure for a VPN call, including the VPN signaling (e.g. QSIG signaling), is performed.

Figure 4:
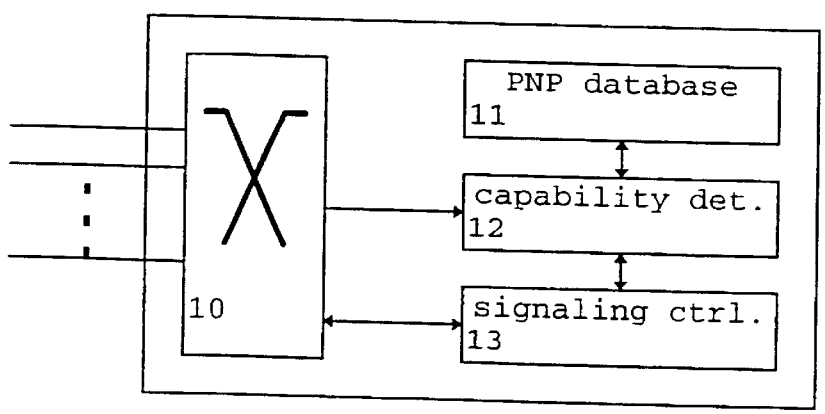
FIG. 4 shows a basic block diagram of a network element for initiating a signaling, according to the preferred embodiment of the present invention.

FIG. 4 shows a basic block diagram of those parts of the network exchanges DX1 and DX2 which are essential for performing the present invention. According to FIG. 4, a switching unit 10 is provided for performing the required switching function between the private branch exchanges PBX1 to PBX3, the PSTN, the Centrex group and the mobile network, i.e. the members of the VPN group. In case a set-up request is received via the switching unit 10, it is supplied to a capability determination unit 12 arranged to determine the capability of the call destination based on a number translation table stored in a PNP data base 11. It is noted that the PNP database 11 is not required if the destination capability is determined by referring to an IN number translation function. The determination result obtained in the capability determination unit 12 is supplied to a signaling control unit 13 arranged to generate the signaling required for setting up the call. Thus, according to the preferred embodiment, the signaling control unit 13 generates a signaling for setting up a basic call, and drops a received VPN signaling information, in case the determination result received from the capability determination unit 12 indicates that the destination does not support the VPN signaling. Otherwise, the signaling control unit 13 initiates the VPN signaling and performs the set-up procedure of the VPN call.

The functional blocks 11 to 13 indicated in FIG. 4 may be realized as concrete hardware structures or as routines of a control program adapted to control a processing means (e.g. CPU) provided in the respective network element.

It is to be noted that the present invention may be applied to any telecommunication network providing a virtual private network function which requires support of a predetermined VPN signaling at a respective destination node. Furthermore, the signaling method according to the preferred embodiment may be performed in any network element arranged for initiating a set-up signaling in a telecommunication network. The above description of the preferred embodiment and the accompanying drawings are therefore only intended to illustrate the present invention. The preferred embodiment of the invention may very within the scope of the attached claims.

In summary, the present invention relates to a signaling method and network element for a virtual private network, wherein a destination capability is determined in response to the receipt of a connection request from a subscriber belonging to the virtual private network. Based on the determination result, an initiation of a virtual private network signaling in the call set-up is decided. Thereby, the signaling load can be reduced already in the originating point, if the destination is not able to support the signaling required for the virtual private network. The capability determination may be based on a private numbering plan used for a number translation in the telecommunication network.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A signaling method for a telecommunication network providing a virtual private network, said signaling method comprising the steps of:

a) determining a destination capability to support virtual private network signaling in response to the receipt of a connection request from a subscriber belonging to said virtual private network, wherein said destination capability is determined on the basis of a table used in a number analysis;

b) deciding on the initiation of a virtual private network signaling in the call set-up, when the determination result in said determination step indicates that the destination is able to support virtual private network signaling, and c) dropping an information relating to said virtual private network signaling, if it is determined in said determination step that the destination is not able to support said virtual private network signaling;

wherein said virtual private network signaling is not initiated if said table indicates a mobile subscriber as the destination of the call.

2. The method according to claim 1, wherein said virtual private network signaling is a QSIG signaling.

3. The method according to claim 1, wherein said table is a private numbering plan stored in an IN node located at the originating node of said connection request.

4. The method according to claim 1, wherein said signaling method is performed in an originating node of said connection request.

5. A network element for initiating a signaling in a telecommunication network providing a virtual private network, said network element comprising:

determining means for determining a destination capability to support virtual private network signaling in response to the receipt of a connection request from a subscriber belonging to said virtual private network, wherein said determining means is arranged to determine said destination capability by referring to a table used in a number analysis; and signaling control means for deciding on the initiation of a virtual private network signaling in the call set-up, when the determination result in said determination step indicates that the destination is able to support virtual private network signaling, wherein the network element is adapted to drop an information relating to said virtual private network signaling, if it is determined in said determining means that the destination is not able to support said virtual private network signaling; and wherein said virtual private network signaling is not initiated if said table indicates a mobile subscriber as the destination of the call.

6. The network element according to claim 5, wherein said determining means is arranged to obtain a private numbering plan (PNP) from an IN node located at said network element.

7. The network element according to claim 5, wherein said signaling control means is arranged to drop an information relating to said virtual private network signaling from a set-up message and to perform a gateway function for said set-up message.

8. The network element according to claim 5, wherein said network element is an originating node of said connection request.

9. The network element according to claim 8, wherein said network element is a network exchange.

10. A method for reducing signaling in a telecommunication network which supports at least one virtual private network (VPN), wherein there are at least two signalling protocol systems for signalling within said at least one VPN, said signaling reduction method comprising the steps of:

receiving a connection request from an origination subscriber in a VPN, wherein said requested connection is between said origination VPN subscriber and a destination VPN subscriber;

determining a capability of the destination VPN subscriber to support a first VPN signalling protocol system, wherein said first VPN signalling protocol system is a system for the interaction of private integrated service exchanges (PINXs) in the VPN, wherein said step of determining the capability to support the first VPN signaling protocol system comprises the sub-step of:

accessing a private numbering plan (PNP) function, wherein said PNP function provides for translating between private VPN addresses and public network addresses, and wherein said PNP function also provides for said step of determining the destination VPN subscriber capability to support the first VPN signaling protocol system; and initiating set up of the requested VPN connection using the first VPN signaling protocol system if it is determined that the destination VPN subscriber supports the first VPN signaling protocol system, or initiating set up of the VPN connection without using the first VPN signaling protocol if it is determined that the destination VPN subscriber does not support the first VPN signaling protocol system.

11. The method of claim 10, wherein the first VPN signaling protocol system comprises a QSIG signalling system.

12. The method of claim 11, wherein at least one VPN subscriber does not have the capability to support QSIG signalling because said at least one VPN subscriber is either a mobile terminal or on a private branch exchange (PBX) incapable of QSIG signalling.

13. The method of claim 10, wherein the PNP function comprises a PNP translation table.

14. The method of claim 10, wherein said PNP function provides for said step of determining the capability to support the first VPN signaling protocol system of the destination VPN subscriber either by providing an indicia in a PNP translation table or based on a numerical comparison of specific digits within the VPN private address of the destination VPN subscriber.

15. The method of claim 14, wherein the indicia in the PNP translation table is at least one of a flag and a bit.

16. The method of claim 10, wherein the telecommunication network supports a plurality of VPNs, and each of the plural VPNs have a different PNP function.

17. The method of claim 10, wherein the PNP function is provided either in an originating network node or in a separate network node near to the originating network node.

18. The method of claim 17, wherein the originating network node or the separate network node comprises at least one of a network exchange, an intelligent network (IN) node, and a switching unit.

19. The method of claim 10, further comprising the step of:

initiating set up of the requested VPN connection using first VPN signaling protocol system if it cannot be unambigiously determined whether the destination VPN subscriber supports first VPN signaling protocol system.

* * * * *